United States Patent
Zhang et al.

(10) Patent No.: US 12,040,616 B2
(45) Date of Patent: Jul. 16, 2024

(54) DISTRIBUTED VOLTAGE CLAMPING METHOD FOR 100% RENEWABLE-ENERGY SENDING-END GRID

(71) Applicant: Zhejiang University, Hangzhou (CN)

(72) Inventors: Zheren Zhang, Hangzhou (CN); Wentao Liu, Hangzhou (CN); Yiyan Dong, Hangzhou (CN); Zheng Xu, Hangzhou (CN); Ying Huang, Hangzhou (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 18/327,784

(22) Filed: Jun. 1, 2023

(65) Prior Publication Data

US 2023/0307913 A1      Sep. 28, 2023

Related U.S. Application Data

(63) Continuation of application No. PCT/CN2023/088718, filed on Apr. 17, 2023.

(30) Foreign Application Priority Data

Nov. 3, 2022   (CN) .......................... 202211370530.6

(51) Int. Cl.
*H02J 3/18*     (2006.01)
*G05B 19/042*   (2006.01)
*H02J 3/38*     (2006.01)

(52) U.S. Cl.
CPC .............. *H02J 3/18* (2013.01); *G05B 19/042* (2013.01); *H02J 3/381* (2013.01); *G05B 2219/2619* (2013.01); *H02J 2300/24* (2020.01)

(58) Field of Classification Search
CPC .......... H02J 3/18; H02J 3/381; H02J 2300/24; G05B 19/042; G05B 2219/2619; Y02E 40/30
See application file for complete search history.

(56) References Cited

U.S. PATENT DOCUMENTS

| | | | |
|---|---|---|---|
| 9,787,096 B2 | 10/2017 | Alteneiji | |
| 2014/0032000 A1* | 1/2014 | Chandrashekhara | H02J 3/40 700/292 |

FOREIGN PATENT DOCUMENTS

| | | |
|---|---|---|
| CN | 103020853 A | 4/2013 |
| CN | 103199549 A | 7/2013 |

(Continued)

OTHER PUBLICATIONS

Xiaofang Song et al., "Adaptability Study of Smart Grid Dispatching Technical Support System with Large-scale Wind Power Integration", East China Electric Power, Sep. 24, 2011, vol. 39, No. 9, pp. 1443-1446.

Chi Zhao et al., "Security Verification Method of Distribution Network Considering the Uncertainties of Distributed Generations", Proceedings of the CSU-EPSA, Dec. 15, 2016, vol. 28, pp. 51-55.

(Continued)

*Primary Examiner* — Charles Cai

(57) ABSTRACT

A distributed voltage clamping method for a 100% renewable-energy sending-end grid, including: selecting key nodes from the 100% renewable-energy sending-end grid, including their voltage levels and positions; installing a dynamic reactive power compensation device on each key node, where the dynamic reactive power compensation device is controlled by a constant alternating-current (AC) voltage effective value, and the instruction value of the constant AC voltage effective value is adjustable according to an operation mode; according to AC voltage variation of the sending-end grid under a typical working condition, judging whether the key nodes meet the checking requirements; if not, selecting more key nodes.

1 Claim, 5 Drawing Sheets

(56) References Cited

FOREIGN PATENT DOCUMENTS

| | | |
|---|---|---|
| CN | 104218569 A | 12/2014 |
| CN | 104318391 A | 1/2015 |
| CN | 105811432 A | 7/2016 |
| CN | 108092278 A | 5/2018 |
| CN | 110198033 A | 9/2019 |
| CN | 111276980 A | 6/2020 |
| CN | 113507128 A | 10/2021 |
| WO | 2011162238 A1 | 12/2011 |
| WO | 2012174827 A1 | 12/2012 |

OTHER PUBLICATIONS

Hui Cai et al., "Study on N-1 Check Criterion for Transmission Network Planning with Flexible Transmission Devices", Power Capacitor & Reactive Power Compensation, Aug. 31, 2020, vol. 41, No. 4, pp. 188-193.

Yan Ming et al., "Comparative study on DC line fault transient characteristics of four typical MMC-HVDC configurations", 2019 IEEE PES Asia-Pacific Power and Energy Engineering Conference (APPEEC), Feb. 13, 2020, Entire document.

\* cited by examiner

DISTRIBUTED VOLTAGE CLAMPING METHOD FOR 100% RENEWABLE-ENERGY SENDING-END GRID

CROSS-REFERENCE TO RELATED APPLICATIONS

This application is a continuation of International Patent Application No. PCT/CN2023/088718, filed on Apr. 17, 2023, which claims the benefit of priority from Chinese Patent Application No. 202211370530.6, filed on Nov. 3, 2022. The content of the aforementioned application, including any intervening amendments thereto, is incorporated herein by reference in its entirety.

TECHNICAL FIELD

This application relates to power transmission and distribution of power systems, and more particularly to a distributed voltage clamping method for a 100% renewable-energy sending-end grid.

BACKGROUND

From 2021 to 2025, China will vigorously develop clean energy, and focus on the construction of nine large onshore clean energy bases in Xinjiang, Hexi Corridor, the upper reaches of the Yellow River and Jiziwan, the upper and lower reaches of Jinsha River, Yalong River Basin, northern Hebei and Songliao. Moreover, China will boost the construction of offshore wind power bases, accelerate the development of offshore wind power clusters, and focus on the construction of five 10-million-kilowatt-class offshore wind power bases in Shandong Peninsula, Yangtze River Delta, southern Fujian, eastern Guangdong and Beibu Gulf.

By promoting the construction of onshore wind power and photovoltaic power generation bases as a whole, and actively developing offshore wind power in the deep sea, the optimal allocation of electric power resources in China is achieved, which helps the clean and low-carbon upgrading and transformation of energy. For large-scale onshore renewable energy bases, they are mainly distributed in northeast China, north China, northwest China and southwest China. However, the high-energy consumption centers are located in the mid-eastern China. In this case, it is necessary to use ultra-high voltage direct current (UHVDC) transmission technology for long-distance transmission of renewable energy. For offshore wind power, alternating-current transmission and low-frequency transmission have more economic advantages for small-scale offshore wind farms, and direct-current transmission more economical for large-scale offshore wind power clusters. Therefore, both a large-scale onshore renewable energy power generation base and a large-scale offshore wind power cluster need to use technology of direct-current transmission.

The 100% renewable energy power generation base has obvious power electronic characteristics. Theoretically, there are two kinds of direct-current transmission technologies. One is the conventional direct-current transmission technology, and the other one is voltage source converter-based high-voltage direct current (VSC-HVDC) transmission technology. The conventional DC transmission technology requires a higher short-circuit ratio of the power grid, and struggles with serious power-frequency overvoltage caused by direct-current blocking and the black start of the sending-end power grid under islanding conditions. The VSC-HVDC transmission technology can not only provide stable voltage and frequency reference for 100% renewable-energy transmission power grid without needing support from synchronous machine power, but also provide black-start power supply, which makes it more suitable for 100% renewable energy power generation base under complex and changeable operation conditions. By far, the offshore wind farms that have been put into operation basically adopt the modular multilevel converter based high voltage direct current transmission (MMC-HVDC).

With the continuous scale expansion of the 100% renewable-energy power-generation base, the renewable-energy base presents two prominent characteristics: (1) the 100% renewable-energy power-generation base has multiple voltage levels (such as 35 kV, 110 kV, 220 kV or 500 kV) of sending-end alternating-current system; (2) the 100% renewable-energy power-generation base occupies large area; for example, the occupied area of the offshore wind farm can reach hundreds of square kilometers, and the occupied area of the onshore 100% renewable-energy power grid can even reach tens of thousands of square kilometers. Consequently, the electrical distance between the sending-end converter station and the renewable-energy station in the VSC-HVDC transmission system of the 100% renewable-energy power-generation base is relatively long. The voltage range of the 100% renewable-energy sending-end grid controlled by sending-end the rectifier station is limited. Moreover, the weak voltage support strength of the grid-connected point of the renewable energy station may lead to poor stability of the sending-end power grid.

Up to now, less attention has been paid on the multiple voltage levels and long-distance lines of the sending-end power grid. In order to improve the stability of the 100% renewable-energy sending-end grid during operation and make full use of the technical and economic advantages of 100% renewable-energy base, it is of great significance to study the voltage control method of the 100% renewable-energy sending-end grid.

SUMMARY

An objective of this application is to provide a distributed voltage clamping method for a 100% renewable-energy sending-end grid, which has simple operation and strong universality, and improves the operation stability of the 100% renewable-energy sending-end grid, exhibiting a brilliant practical application prospect.

This application provides a distributed voltage clamping method for a 100% renewable-energy sending-end grid, comprising:

(1) selecting a plurality of key nodes from the 100% renewable-energy sending-end grid;

(2) installing a first dynamic reactive power compensation device on each of the plurality of key nodes; and (3) according to a voltage variation of each node of the 100% renewable-energy sending-end grid under a typical working condition, judging whether the 100% renewable-energy sending-end grid meets a checking requirement; if not, additionally selecting several nodes from nodes of the 100% renewable-energy sending-end grid excluding the plurality of key nodes as key nodes, and installing a second dynamic reactive power compensation device on individual newly-added key nodes until the 100% renewable-energy sending-end grid meets the checking requirement.

In an embodiment, the 100% renewable-energy sending-end grid comprises a plurality of renewable-energy stations, wherein the plurality of renewable-energy stations are each independently a photovoltaic power station, an onshore wind farm or an offshore wind farm; and the plurality of renewable-energy stations are connected to an alternating-current (AC) system, and are collected to a sending-end rectifier station after several boosting operations.

In an embodiment, in step (1), all nodes of the 100% renewable-energy sending-end grid (that is, an alternating-current bus) are group into e.g., 35 kV group, 110 kV group, 220 kV group, and 500 kV group according to voltage level; and the plurality of key nodes are selected from nodes in a group with a second-highest voltage level.

In an embodiment, in step (2), the first dynamic reactive power compensation device is controlled by a constant alternating-current voltage effective value; and an instruction value of the alternating-current voltage effective value is adjustable according to an operation mode, and is controlled within a range of 0.9~51.05 per unit (p.u.).

In an embodiment, in step (3), the typical working condition comprises:
  typical working condition 1: the plurality of renewable-energy stations experience power change when the 100% renewable-energy sending-end grid is sound, or under a N−1 fault condition; and
  typical working condition 2: the power of each of the plurality of renewable-energy stations in the 100% renewable-energy sending-end grid steps to 0.

In an embodiment, in step (3), under the typical working condition 1, the checking requirement is that the first dynamic reactive power compensation device does not exceed its capacity limitation, and all nodes of the 100% renewable-energy sending-end grid each have a voltage ranging from 0.95 p.u. to 1.05 p.u.; and the "the first dynamic reactive power compensation device does not exceed its capacity limitation" indicates that on the premise of maintaining a voltage of each of the plurality of key nodes at an instruction value, a reactive power injected from the first dynamic reactive power compensation device to a corresponding key node does not exceed the capacity limitation of the first dynamic reactive power compensation device; and
  under the typical working condition 2, the checking requirement is that a transient voltage effective value of all nodes of the 100% renewable-energy sending-end grid does not exceed 1.3 p.u..

In an embodiment, in step (3), when the 100% renewable-energy sending-end grid fails to meet the checking requirement, several nodes are additionally selected from nodes of the 100% renewable-energy sending-end grid excluding the plurality of key nodes in a descending order of voltage level as key nodes, and the second dynamic reactive power compensation device is installed on individual newly-added key nodes until the 100% renewable-energy sending-end grid meets the checking requirement.

In an embodiment, the instruction value of the alternating-current voltage effective value of the first dynamic reactive power compensation device can be determined by using a voltage-reactive droop control algorithm.

Compared with the prior art, this application has the following beneficial effects.

1. The distributed voltage clamping method provided herein is proposed based on the local control of the dynamic reactive power compensation devices on the alternating-current buses with different voltage levels. The method provided herein is simple to implement and high in reliability. providing a certain reference for future engineering design.

2. The method provided herein is strong in universality. Theoretically, the distributed voltage clamping method is suitable for a 100% renewable-energy sending-end grid with various topological structures. Through the voltage-clamp control of the alternating-current buses with different voltage levels, the voltage stability of the sending-end power grid is improved, creating a huge application value in practical engineering.

DETAILED DESCRIPTION OF EMBODIMENTS

This application will be described in detail below with reference to the accompanying drawings and the following embodiments.

Figure 2:
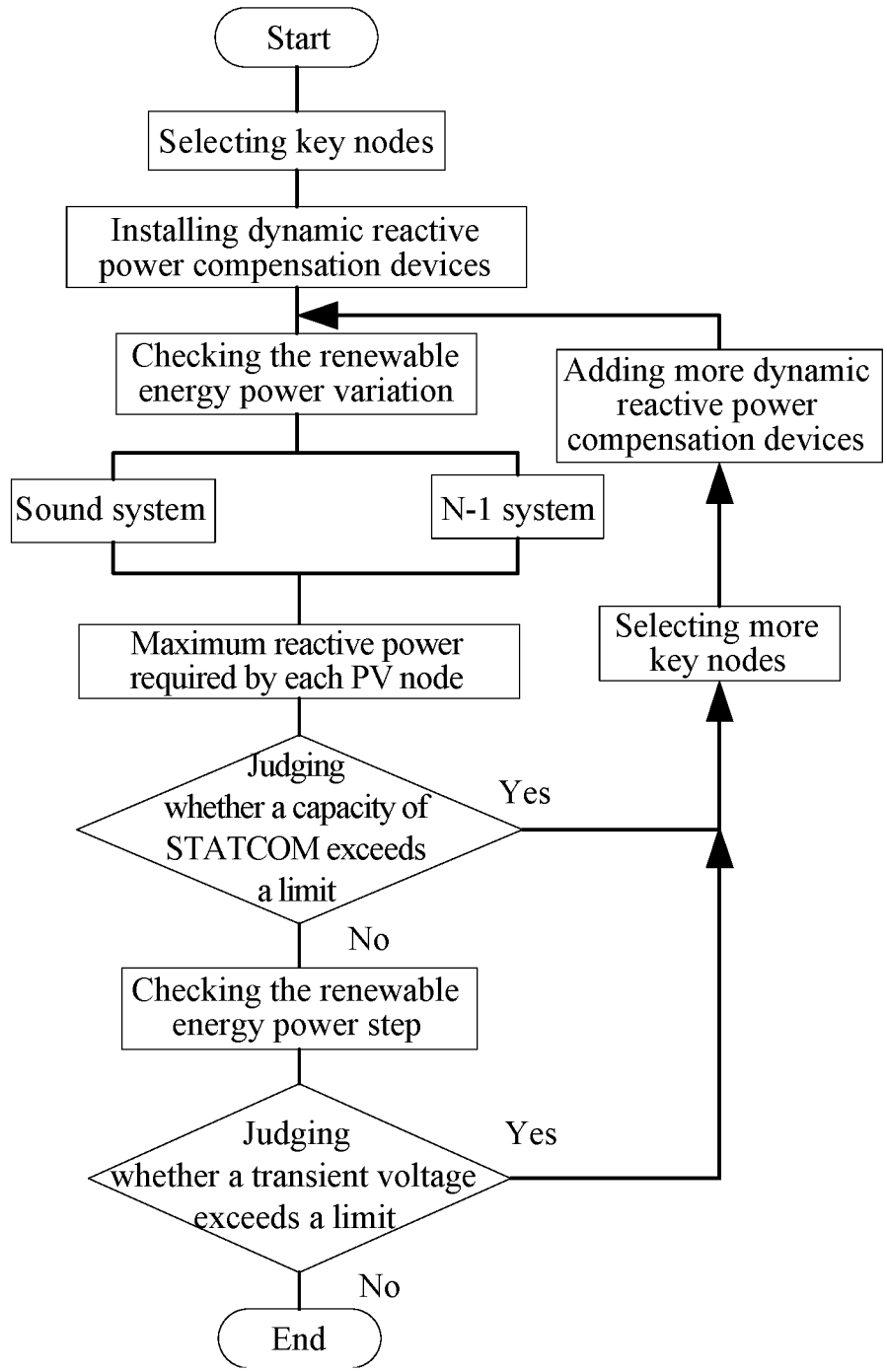
FIG. 2 is a flow chart of a distributed voltage clamping method for the 100% renewable-energy sending-end grid according to an embodiment of this application.

Referring to an embodiment shown in FIG. 2, provided herein is a distributed voltage clamping method for 100% renewable-energy sending-end grid, which is performed as follows.

(1) A plurality of key nodes are selected in the 100% renewable-energy sending-end grid, including their voltage levels and locations. The plurality of key nodes are sequentially numbered as $N_1$-$N_m$.

The 100% renewable-energy sending-end grid includes a plurality of renewable-energy stations. The plurality of renewable energy stations may be each independently a photovoltaic power station, an onshore wind farm or an offshore wind farm. The plurality of renewable-energy stations are connected to an alternating-current system, and are collected to a sending-end rectifier station after several boosting operations.

The voltage levels of all nodes are 35 kV, 110 kV, 220 kV and 500 kV, etc. The plurality of key nodes are selected from nodes in a group with a second-highest voltage level (2) Dynamic reactive power compensation devices (marked as $D_1$-$D_m$) are respectively and correspondingly installed on the plurality of key nodes $N_1$-$N_m$. The dynamic reactive power compensation devices are controlled by a constant alternating-current voltage effective value. Instruction values of the constant alternating-current voltage effective values of the dynamic reactive power compensation devices are $U_1^*$-$U_m^*$, respectively.

The $U_1^*$-$U_m^*$ are adjustable according to an operation mode. For example, the voltage-reactive droop control method is used to control the voltage of each of the plurality of key nodes to be within 0.95~1.05 p.u.

(3) According to an alternating-current voltage variation of the sending-end grid under a typical working condition, whether the selected key nodes meet the checking requirements is determined. If not, some nodes are additionally selected from the nodes of the grid excluding the plurality of key nodes as key nodes.

Under the typical working condition that the plurality of renewable-energy stations experience power change when the system is sound, or under an alternating-current line N−1 fault condition, the checking requirement is that the dynamic reactive power compensation device does not exceed its capacity limitation, and each alternating-current bus has a voltage per-unit value ranging from 0.95 to 1.05 p.u.

Under the typical working condition that a power of each of the plurality of renewable-energy stations in the 100% renewable-energy sending-end grid steps to 0, the checking requirement is that a transient voltage effective value of each of the alternating-current bus of the 100% renewable-energy sending-end grid does not exceed 1.3 p.u.

The priority is given to nodes on the AC bus with the second-highest voltage level when additionally selecting nodes as key nodes. If the checking requirement is met, only nodes on the AC bus with the second-highest voltage level are selected. If the checking requirement still fails to be satisfied after selecting nodes on the AC bus with the second-high voltage level as key nodes, nodes on the bus with the highest voltage level are selected as the key nodes. If the checking requirement still cannot be met, nodes on the bus with the third-highest voltage level are additionally selected as the key nodes.

Figure 1:
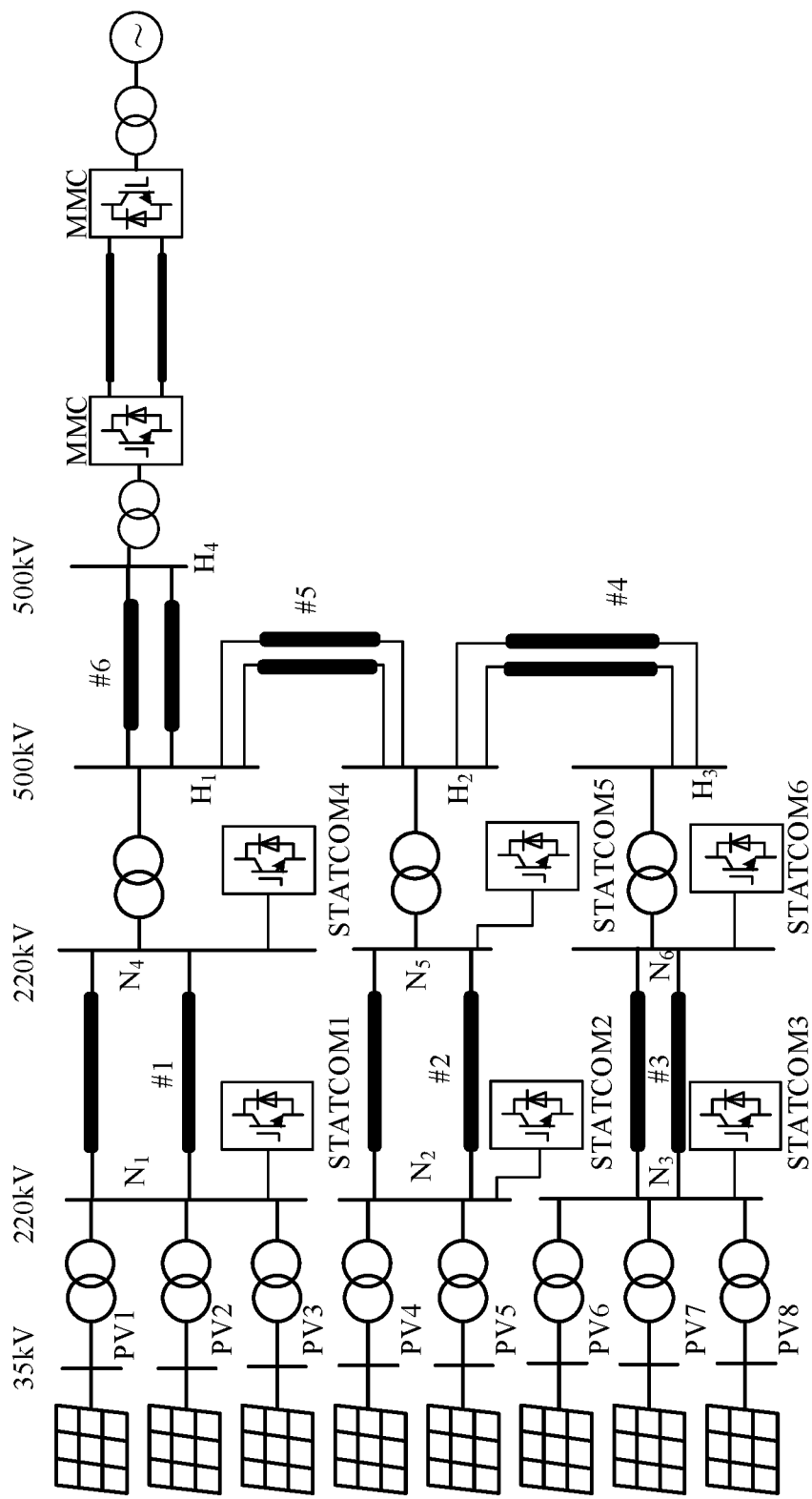
FIG. 1 is a structural diagram of a distributed voltage clamping method for a 100% renewable-energy sending-end grid through a VSC-HVDC transmission system according to an embodiment of this application.

Referring an embodiment shown in FIG. 1, the 100% renewable-energy sending-end grid can be divided into 8 regions according to the geographical location. Each of the 8 regions is equivalent to an aggregated photovoltaic power station connected to a 35 kV alternating-current system. The aggregated photovoltaic power station has a rated power equal to the sum of the rated power of all photovoltaic power stations in the region, which is assumed to be 500 MW in this embodiment. 8 equivalent aggregated photovoltaic power stations are connected to three 220 kV alternating-current buses through boosting, and then transmitted to three 220 kV substations through double-circuit alternating-current lines (about 10 km) to boost to 500 kV. Each 500 kV bus is collected to a 500 kV VSC-HVDC station through double-circuit alternating-current lines (about 50 km), which are as performed as follows.

(1) All 220 kV alternating-current buses with secondary high voltage level are selected as clamping nodes (marked as $N_1 \sim N_6$). Dynamic reactive power compensation devices (marked as STATCOM 1~STATCOM 6) are installed on the clamping nodes.

Dynamic reactive power compensation devices are controlled by constant alternating-current voltage effective value. In this embodiment, the instruction values $U_1^*$ to $U_6^*$ of alternating-current voltage effective value of the dynamic reactive power compensation devices are all set to be 1.0 p.u.

(2) The type of individual nodes of the alternating-current sending-end power grid is set. The clamping nodes ($N_1$ to $N_6$) are set as PV nodes, the alternating-current bus of the sending-end VSC-HVDC station is set as a balance node, and the rest alternating-current buses are set as PQ nodes. The sending-end VSC-HVDC station adopts constant V/f control, and the VSC-HVDC station at a receiving end adopts control with constant direct-current voltage and constant alternating-current reactive power.

(3) Though power flow calculation, the typical working condition of power variations of various renewable-energy stations of the sound system and the alternating-current line N−1 system is checked. The typical working condition of power variation of the selected renewable-energy station includes 18 cases of full power and no power of the photovoltaic power station, specifically including that all photovoltaic power stations generate full power, a single aggregated photovoltaic power station generates no power and other photovoltaic power stations generate full power (8 types), all photovoltaic power stations generate no power, the single aggregated photovoltaic power station generates full power and other photovoltaic power stations generate no power (8 types).

(4) Through transient simulation, the working condition of the renewable-energy power step is checked. Under the working condition of the renewable-energy power step, all the photovoltaic power stations suddenly drop from full power generation to no power generation.

The system parameters in this embodiment are shown in Table 1.

TABLE 1

| System parameters | |
|---|---|
| Items | Scale |
| Equivalent photovoltaic power station | |
| Rated power | 500 MW |
| 220 kV alternating-current line | |
| Rated voltage | 230 kV |
| Length | 10 km(#1), 11 km(#2), 10 km(#3) |
| The number of parallel circuits | 2 |
| 500 kV alternating-current line | |
| Rated voltage | 525 kV |
| Length | 45 km(#4), 50 km(#5), 55 km(#6) |
| The number of parallel circuits | 2 |
| Sending-end VSC-HVDC station | |
| Control mode | Constant V/f control |
| Rated capacity of VSC-HVDC station | 5000 MVA |
| Converter transformer capacity | 6000 MVA |
| Converter transformer ratio | 525 kV/500 kV |
| Converter transformer leakage reactance | 0.1 p.u. |
| Rated direct-current voltage | 500 kV |
| Receiving-end VSC-HVDC station | |
| Control mode | Constant direct-current voltage and constant alternating-current reactive power |
| Rated capacity of VSC-HVDC | 5000 MVA |
| Converter transformer capacity | 6000 MVA |
| Converter transformer ratio | 525 kV/500 kV |
| Converter transformer leakage reactance | 0.1 p.u. |
| Rated direct-current voltage | 500 kV |

The simulation model of the renewable-energy system shown in FIG. 1 is established in the electromechanical transient simulation software PSS/E. By using the Newton-Ralfsnn's method, 18 typical working conditions occur under the sound system and 216 typical working conditions occur when 12 alternating-current lines appear N−1 conditions in turn, so as to obtain 234 working conditions in total. Under 234 working conditions, the voltage of each key node from $N_1$ to $N_6$ is maintained at 1.0 p.u., and the required maximum reactive power can be obtained. As demonstrated in Table 2, the maximum reactive power required by each key node of $N_1$~$N_6$ does not exceed the capacity of the corresponding dynamic reactive power compensation device (STATCOM$_1$~STATCOM$_6$), and the power variation of the renewable-energy station passes the checking.

TABLE 2

Parameters of clamping nodes

| Clamping nodes | $N_1$ | $N_2$ | $N_3$ | $N_4$ | $N_5$ | $N_6$ |
|---|---|---|---|---|---|---|
| STATCOM capacity | 550 | 350 | 550 | 870 | 550 | 900 |
| Maximum reactive power as required | 437.3 | 276.0 | 440.7 | 695.5 | 439.8 | 715.8 |

Figure 3:
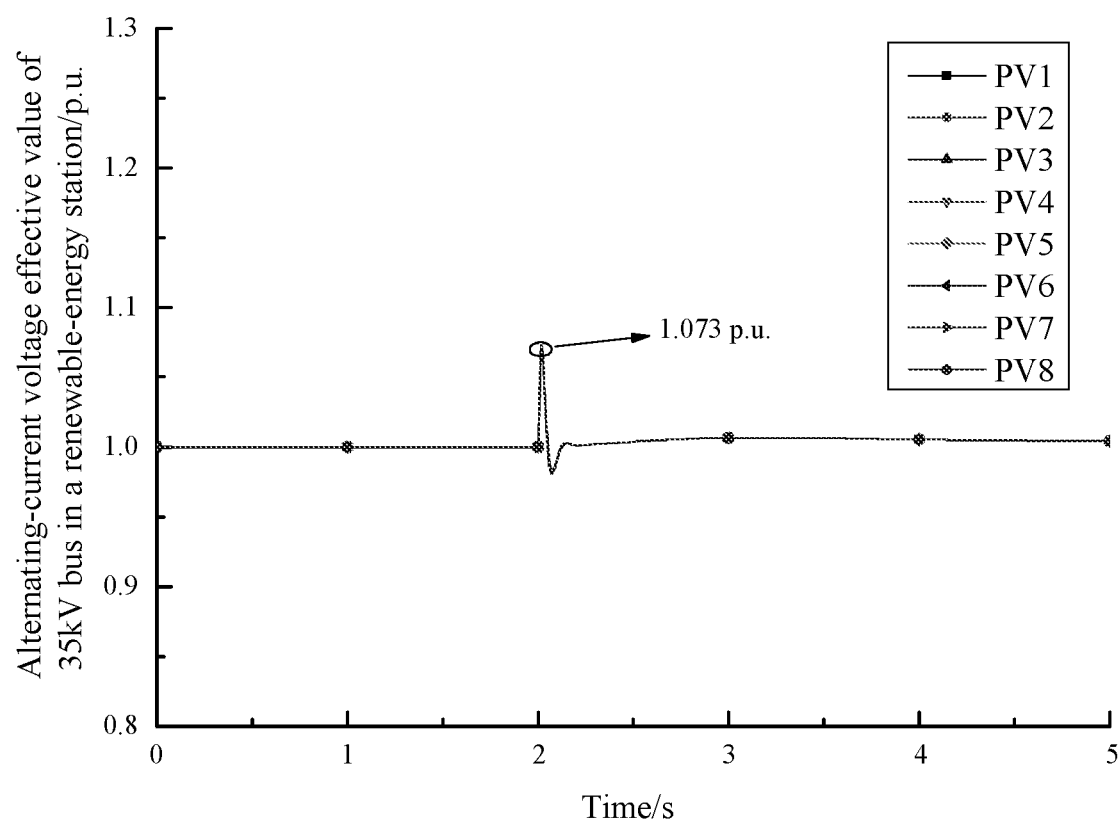
FIG. 3 is a schematic diagram of a simulation waveform of an alternating-current voltage effective value of 35 kV bus in a renewable-energy station according to an embodiment of this application.
Figure 4:
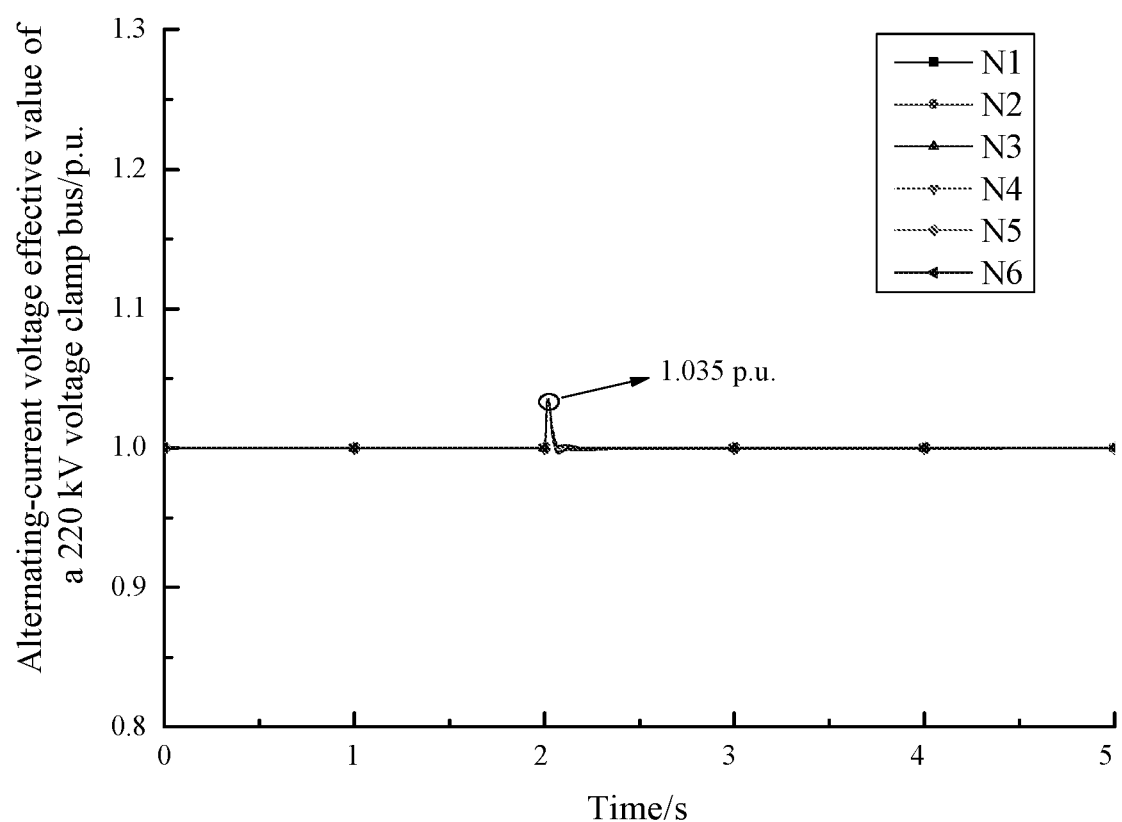
FIG. 4 is a schematic diagram of a simulation waveform of an alternating-current voltage effective value of a 220 kV voltage clamp bus according to an embodiment of this application.
Figure 5:
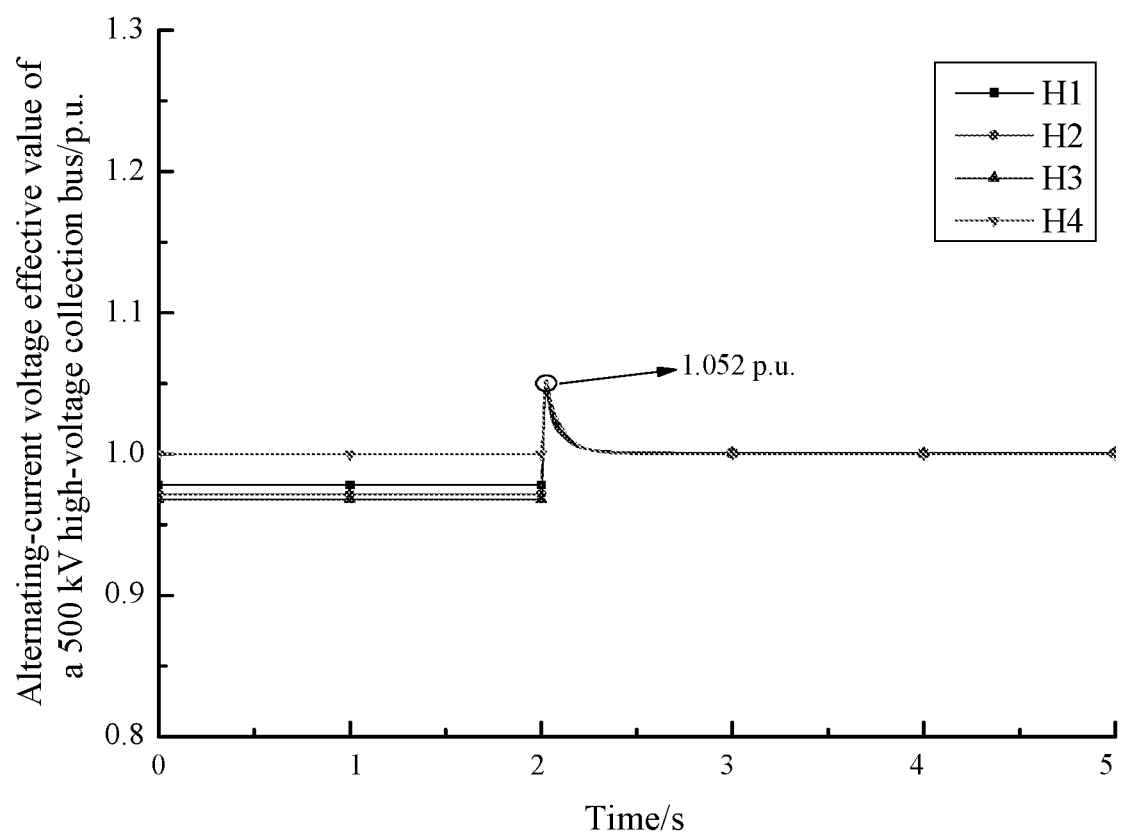
FIG. 5 is a schematic diagram of a simulation waveform of an alternating-current voltage effective value of a 500 kV high-voltage collection bus according to an embodiment of this application.

A transient model is built in electromechanical transient simulation software PSS/E to test the transient effect of the distributed clamp control strategy. Before t=2.0 s, all photovoltaic power stations are operating at full power under a light intensity of 1000 W/m². Assuming that when t=2.0 s, the light intensity of all photovoltaic power stations is reduced to 0 W/m² to simulate the most severe situation faced by photovoltaic power stations. FIG. 3 shows the simulation results of the effective value of the alternating-current voltage of the 35 kV bus in the renewable-energy power generation. FIG. 4 shows the simulation results of the effective value of the alternating-current voltage of the 220 kV clamp bus. FIG. 5 shows the simulation results of the effective value of alternating-current voltage of the 500 kV high-voltage collection bus. It can be concluded from the simulation results shown in FIGS. 3-5 that when the output of renewable energy fluctuates in a wide range, the distributed voltage clamping method provided herein can control the transient overvoltage of the outlet of the renewable energy plant to be within 1.08 p.u., and control the transient overvoltage of the 220 kV clamp bus to be within 1.04 p.u, and control the transient overvoltage of 500 kV bus to be within 1.06 p.u. In this case, the system can avoid serious overvoltage and instability. The checking of power step of renewable energy is passed, that is, the simulation proves the effectiveness the method provided herein.

Described above are merely illustrative of this application, and are intended to facilitate the understanding and implementation of this application. It should be understood by those skilled in the art that various modifications made without departing from the spirit and scope of this application shall fall within the scope of this application defined by the appended claims.

What is claimed is:

1. A distributed voltage clamping method for a 100% renewable-energy sending-end grid, comprising:
   (1) selecting a plurality of key nodes from the 100% renewable-energy sending-end grid;
   (2) installing a first dynamic reactive power compensation device on each of the plurality of key nodes; and
   (3) according to a voltage variation of each node of the 100% renewable-energy sending-end grid under a typical working condition, judging whether the 100% renewable-energy sending-end grid meets a checking requirement; in response to not meeting the checking requirement, additionally selecting several nodes from nodes of the 100% renewable-energy sending-end grid excluding the plurality of key nodes as key nodes, and installing a second dynamic reactive power compensation device on individual newly-added key nodes until the 100% renewable-energy sending-end grid meets the checking requirement;

wherein the 100% renewable-energy sending-end grid comprises a plurality of renewable-energy stations, wherein the plurality of renewable-energy stations are each independently a photovoltaic power station, an onshore wind farm or an offshore wind farm; and the plurality of renewable-energy stations are connected to an alternating-current (AC) system, and are collected to a sending-end rectifier station after several boosting operations;

all nodes of the 100% renewable-energy sending-end grid are grouped according to voltage level; and the plurality of key nodes are selected from nodes in a group with a second-highest voltage level;

the first dynamic reactive power compensation device is controlled by a constant alternating-current voltage effective value; and an instruction value of the alternating current voltage effective value is adjusted according to an operation mode, and is controlled within a range of 0.95-1.05 per unit (p.u.) by using a voltage-reactive power droop control algorithm;

the typical working condition comprises:

typical working condition 1: the plurality of renewable-energy stations experience power change in response to the 100% renewable-energy sending-end grid being sound, or under a N−1 fault condition; and typical working condition 2: a power of each of the plurality of renewable energy stations in the 100% renewable-energy sending-end grid steps to 0;

under the typical working condition 1 the checking requirement is that the first dynamic reactive power compensation device does not exceed its capacity limitation, and all nodes of the 100% renewable-energy sending-end grid each have a voltage ranging from 0.95 p.u. to 1.05 p.u.; and the "the first dynamic reactive power compensation device does not exceed its capacity limitation" indicates that on the premise of maintaining a voltage of each of the plurality of key nodes at an instruction value, a reactive power injected from the first dynamic reactive power compensation device to a corresponding key node does not exceed the capacity limitation of the first dynamic reactive power compensation device; and under the typical working condition 2, the checking requirement is that a transient voltage effective value of all nodes of the 100% renewable-energy sending-end grid does not exceed 1.3 p.u.;

in response to the 100% renewable-energy sending-end grid failing to meet the checking requirement, several nodes are additionally selected from nodes of the 100% renewable-energy sending-end grid excluding the plurality of key nodes in a descending order of voltage level as key nodes, and the second dynamic reactive power compensation device is installed on individual newly-added key nodes until the 100% renewable-energy sending-end grid meets the checking requirement.

* * * * *